US008347700B2

(12) United States Patent
Azadeh

(10) Patent No.: US 8,347,700 B2
(45) Date of Patent: Jan. 8, 2013

(54) DEVICE FOR OPERATING AN INTERNAL COMBUSTION ENGINE

(75) Inventor: Reza Azadeh, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 50 days.

(21) Appl. No.: 12/999,712

(22) PCT Filed: Oct. 22, 2009

(86) PCT No.: PCT/EP2009/063920

§ 371 (c)(1), (2), (4) Date: Dec. 17, 2010

(87) PCT Pub. No.: WO2010/057738

PCT Pub. Date: May 27, 2010

(65) Prior Publication Data

US 2012/0006107 A1 Jan. 12, 2012

(30) Foreign Application Priority Data

Nov. 19, 2008 (DE) ........................ 10 2008 058 008

(51) Int. Cl.
*G01M 15/00* (2006.01)

(52) U.S. Cl. .................................................... 73/114.31

(58) Field of Classification Search ................ 73/114.31
See application file for complete search history.

(56) References Cited

U.S. PATENT DOCUMENTS 5,813,389 A * 9/1998 Kitamura et al. ............. 123/673
6,276,349 B1 8/2001 Kofler et al. .................. 123/673
6,314,952 B1 11/2001 Turin et al. .................... 123/673
6,325,056 B1 12/2001 Weining et al. ............... 123/673
6,947,826 B2 9/2005 Deibert et al. ................ 701/109
7,051,725 B2 * 5/2006 Ikemoto et al. ............... 123/673
7,284,545 B2 10/2007 Rösel et al. ................... 123/673
7,331,214 B2 2/2008 Aliakbarzadeh et al. .... 73/23.32
7,481,104 B2 1/2009 Schnaibel et al. ......... 73/114.73
7,562,653 B2 7/2009 Zhang .......................... 123/673
(Continued)

FOREIGN PATENT DOCUMENTS

DE 19846393 A1 4/2000
(Continued)

OTHER PUBLICATIONS

International PCT Search Report and Written Opinion, PCT/EP2009/063920, 16 pages, Dec. 18, 2009.

*Primary Examiner* — Freddie Kirkland, III
(74) *Attorney, Agent, or Firm* — King & Spalding L.L.P.

(57) ABSTRACT

An association unit is designed to determine cylinder-individual lambda signals on the basis of a lambda probe signal and to determine lambda deviation signals for the respective cylinders based on the lambda signals in relation to an averaged lambda signal. Furthermore, an observer has a sensor model of the lambda probe that is arranged in a feedback branch. The lambda deviation signals are fed to the input side and observer output quantities in relation to the respective cylinder are representative of the injection characteristics deviations from predetermined injection characteristics. A parameter detection unit impresses a predetermined interference pattern from cylinder-individual mixture deviations. It further changes at least one sensor model parameter as a detection parameter in response to the respectively predetermined interference pattern for as long as the observer output quantities represent the portion of the interference pattern associated with the cylinders thereof in a predetermined manner.

10 Claims, 7 Drawing Sheets

U.S. PATENT DOCUMENTS

| | | | | |
|---|---|---|---|---|
| 7,707,822 | B2 * | 5/2010 | Katoh et al. | 60/277 |
| 7,762,244 | B2 * | 7/2010 | Aliakbarzadeh | 123/693 |
| 8,095,296 | B2 | 1/2012 | Kirstaetter et al. | 701/108 |
| 2002/0026930 | A1 * | 3/2002 | Ueno et al. | 123/679 |
| 2008/0035132 | A1 | 2/2008 | Katoh et al. | 123/673 |
| 2008/0120017 | A1 * | 5/2008 | Rodatz et al. | 701/108 |
| 2009/0056686 | A1 | 3/2009 | Suzuki | 123/703 |

FOREIGN PATENT DOCUMENTS

| | | | |
|---|---|---|---|
| DE | 19903721 | C1 | 7/2000 |
| DE | 10011690 | A1 | 9/2001 |
| DE | 10304245 | B3 | 7/2004 |
| DE | 102004004291 | B3 | 1/2005 |
| DE | 10358988 | B3 | 5/2005 |
| DE | 102004026176 | B3 | 8/2005 |
| DE | 102005034690 | B3 | 1/2007 |
| DE | 102008001569 | A1 | 10/2009 |
| EP | 0826100 | | 11/1999 |
| EP | 1136684 | A2 | 9/2001 |
| EP | 1424475 | A2 | 6/2004 |
| WO | 96/35048 | | 11/1996 |
| WO | 03/006810 | A1 | 1/2003 |
| WO | 2004/059152 | A1 | 7/2004 |
| WO | 2007/066209 | A1 | 6/2007 |

* cited by examiner

DEVICE FOR OPERATING AN INTERNAL COMBUSTION ENGINE

CROSS-REFERENCE TO RELATED APPLICATIONS

This application is a U.S. National Stage Application of International Application No. PCT/EP2009/063920 filed Oct. 22, 2009, which designates the United States of America, and claims priority to German Application No. 10 2008 058 008.2 filed Nov. 19, 2008, the contents of which are hereby incorporated by reference in their entirety.

TECHNICAL FIELD

The invention relates to a device for operating an internal combustion engine.

BACKGROUND

As a consequence of increasingly strict legal regulations concerning permissible harmful emissions in motor vehicles which have internal combustion engines, the harmful emissions must be kept as low as possible during operation of the internal combustion engine. On one hand, this can be achieved by reducing the harmful emissions that are produced during the combustion of the air/fuel mixture in the respective cylinder of the internal combustion engine. On the other hand, exhaust-gas postprocessing systems are used in internal combustion engines, converting the harmful emissions that are produced during the combustion process of the air/fuel mixture in the respective cylinder into harmless substances.

Catalytic converters are used for this purpose, converting carbon monoxide, hydrocarbons and nitrogen oxide into harmless substances.

Both selectively influencing the generation of harmful emissions during the combustion, and efficiently converting the harmful components by means of a catalytic converter, require the air/fuel ratio in the respective cylinder to be adjusted very precisely.

The textbook entitled “Handbuch combustion engine”, edited by Richard von Basshuysen and Fred Schafer, 2nd edition, published by Vieweg & Sohn Verlagsgesellschaft mbH, June 2002, pages 559 to 561, discloses a binary lambda control featuring a binary lambda probe which is arranged upstream of the exhaust gas catalytic converter. The binary lambda control comprises a PI regulator, the P- and I-portions being stored in characteristic maps via engine speed and load. In the case of the binary lambda control, the excitation of the catalytic converter, also referred to as lambda fluctuation, is implicitly derived from the on-off control. The amplitude of the lambda fluctuation is set to within approximately 3%.

In order to meet future statutory requirements relating to harmful emissions in particular, use is increasingly made of catalytic converters that are close to the engine. Due to the short mixing section from the outlet valve to the catalytic converter, these often require a very limited tolerance in the air/fuel ratio in the individual cylinders of an exhaust-gas bank, and specifically a significantly more limited tolerance than in the case of a catalytic converter arrangement that is remote from the engine. A cylinder-specific lambda control can be used in this context.

DE 198 46 393 A1 discloses a cylinder-selective control of the air/fuel ratio in a multicylinder combustion engine, featuring a lambda probe which is designed as a jump probe. In the context of said cylinder-selective control, the voltage deviation of the lambda probe voltage signal of a cylinder is formed in relation to the voltage signals of the adjacent cylinders. Correction of the injection is then performed using the difference value. In this case, it is taken into consideration that precisely the distinct change in the probe voltage in the region of the exactly stoichiometric air/fuel ratio allows even small deviations from an optimal air/fuel ratio to be identified.

EP 0 826 100 B1 discloses a method for cylinder-selective control of the fuel/air ratio for an internal combustion engine comprising a plurality of cylinders. Provision is made for a lambda control entity, to which is assigned an oxygen sensor that emits a sensor signal representing a corresponding oxygen content of the total exhaust gas from the individual exhaust-gas packets of the individual cylinders. For each value of the sensor signal, the associated lambda actual value is determined with reference to a characteristic curve. From these values, a lambda mean value is formed for each oxygen sensor, and the difference between a lambda reference value, which is predefined as a function of the load of the internal combustion engine, and the lambda mean value is used as an input variable of a global regulator and is supplied to a global lambda regulator of the lambda control entity for the purpose of correcting the basic injection signal, such that a theoretical air/fuel ratio can be set. Provision is further made for a single-cylinder lambda regulator for controlling the individual air/fuel ratio of the individual cylinders. The cylinder-selective output variable of this single-cylinder lambda regulator is superimposed on the output variable of the global lambda regulator, and a basic injection signal is corrected individually per cylinder using the value that is obtained therefrom.

DE 100 11 690 A1 discloses a cylinder-selective lambda control which features a wideband lambda probe. DE 103 58 988 B3 also discloses a cylinder-specific lambda control in connection with a linear lambda probe.

DE 103 04 245 B3 discloses a method for adapting signal sampling of lambda probe signal values in order to implement a cylinder-selective lambda control for a multicylinder internal combustion engine, wherein time points for capturing the lambda values of the individual cylinders, relative to a crankshaft position of the internal combustion engine, are set such that a characteristic parameter assumes an extreme value which is a measure for the deviation of the lambda values of the individual cylinders.

According to DE 10 2004 026 176 B3, in the context of capturing a cylinder-specific air/fuel ratio for an internal combustion engine, a sampling crankshaft angle is determined relative to a reference position of the piston of the respective cylinder, for the purpose of capturing the measured signal of the exhaust-gas probe, and specifically as a function of a variable which characterizes the air/fuel ratio in the respective cylinder. The measured signal is captured at the sampling crankshaft angle and assigned to the respective cylinder.

DE 10 2004 004 291 B3 discloses capturing the measured signal in an exhaust-gas probe and assigning it to the respective cylinder at a predefined crankshaft angle relative to a reference position of the piston of the respective cylinder. The predefined crankshaft angle is adapted depending on an instability criterion of a regulator. An actuating variable for influencing the air/fuel ratio in the respective cylinder is generated by means of the regulator as a function of the measured signal that is captured for the respective cylinder.

According to DE 10 2005 034 690 B3, a predefined crankshaft angle for capturing an air/fuel ratio by means of a measured signal, for assignment to a respective cylinder, is adapted as a function of a quality criterion that is dependent on irregular running and a driveshaft of the internal combustion engine.

SUMMARY

According to various embodiments, a device for operating an internal combustion engine comprising a plurality of cylinders can be provided, which device contributes in a simple manner to low-pollutant operation.

According to an embodiment, in a device for operating an internal combustion engine which has a plurality of cylinders, each of these being assigned an injection valve, and an exhaust-gas train comprising an exhaust-gas catalytic converter and a lambda probe that is arranged in the exhaust-gas catalytic converter or upstream thereof, provision is made for an assignment unit which is designed to determine cylinder-specific lambda signals as a function of the measured signal of the lambda probe and to determine, as a function of the cylinder-specific lambda signals, lambda deviation signals for the respective cylinders, relative to a lambda signal that is averaged over the cylinder-specific lambda signals, provision is made for an observer comprising a sensor model of the lambda probe, said model being arranged in a feedback branch of the observer, wherein the observer is so designed that the cylinder-specific lambda deviation signals are supplied to its input side, and observer output variables relating to the respective cylinder are representative of deviations of the injection characteristics of the injection valve of the respective cylinder from predefined injection characteristics, provision is made for a parameter detection unit, which is designed to: —impose a predefined disturbance pattern from cylinder-specific mixture deviations, —modify at least one parameter of the sensor model as a detection parameter, in response to the respectively predefined disturbance pattern, until at least one of the observer output variables represents that portion of the disturbance pattern which is assigned to its cylinder, and—output the at least one detection parameter.

According to a further embodiment, the device may comprise a diagnostic unit which is designed to determine, as a function of the at least one detection parameter, whether the lambda probe is operating correctly or incorrectly. According to a further embodiment, the device may comprise an adaptation unit which is designed to adapt at least one parameter of the sensor model as a function of the at least one detection parameter, for operation with respective cylinder-specific lambda regulators which are so designed as to be supplied in each case with the respective observer output variable as an input variable that is assigned to the respective cylinder, and the respective regulator actuating signal influences the metered fuel mass in the respective cylinder. According to a further embodiment, the parameter detection unit can be designed such that the respectively predefined disturbance pattern is emission-neutral. According to a further embodiment, the lambda probe can be designed as a binary lambda probe, provision can be made for a binary lambda regulator, which is designed such that a control input variable depends on the signal of the binary lambda probe, and such that its regulator actuating signal influences a metered fuel mass, and the assignment unit can be designed such that, when the measured signal of the binary lambda probe is outside of a transition phase between a lean phase and a rich phase, the cylinder-specific lambda signals are determined as a function of the measured signal of the binary lambda probe.

BRIEF DESCRIPTION OF THE DRAWINGS

Exemplary embodiments are explained in greater detail below with reference to the schematic drawings, in which.

Figure 1:
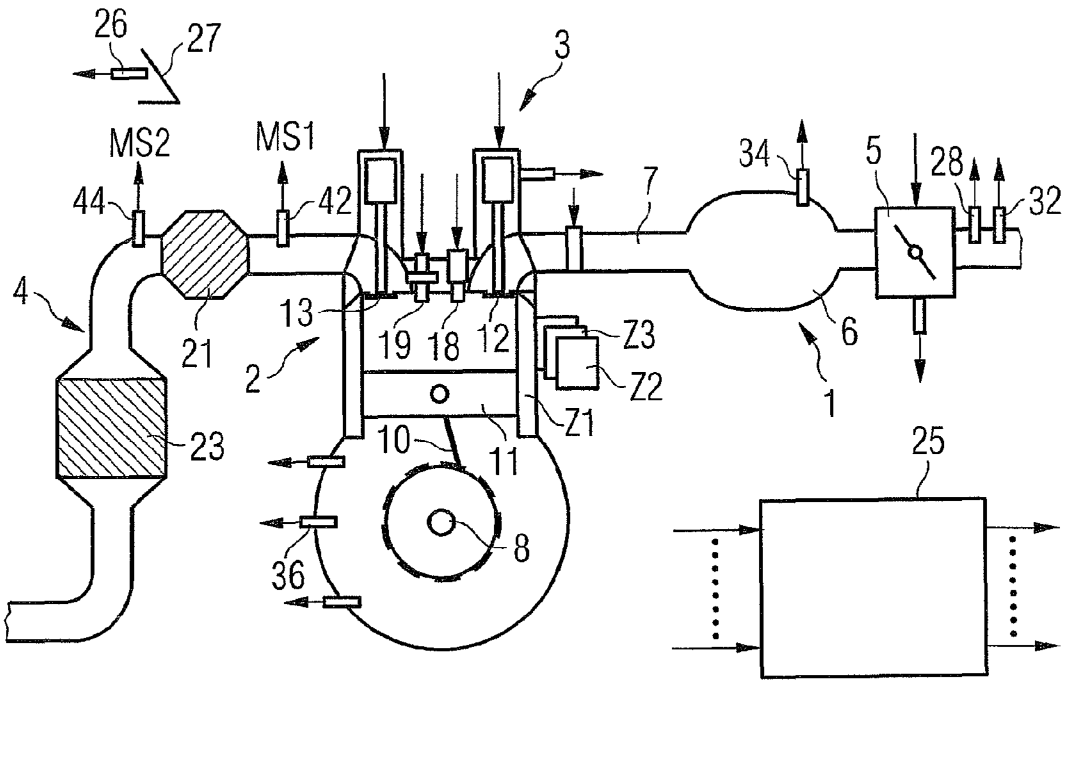
FIG. 1 shows an internal combustion engine with a control device.

Elements having identical construction or function are characterized by the same reference signs in all of the figures.

DETAILED DESCRIPTION

According to various embodiments, a device can be provided for operating an internal combustion engine which has a plurality of cylinders, each of these being assigned an injection valve, and an exhaust-gas train comprising an exhaust-gas catalytic converter and a lambda probe that is arranged in the exhaust-gas catalytic converter or upstream thereof. The lambda probe can be designed as a wideband probe (also referred to as a linear lambda probe) or a jump probe (also referred to as a binary lambda probe), for example.

Provision is made for an assignment unit which is designed to determine cylinder-specific lambda signals as a function of the measured signal of the lambda probe. It is also designed to determine, as a function of the cylinder-specific lambda signals, lambda deviation signals for the respective cylinders, relative to a lambda signal that is averaged over the cylinder-specific lambda signals.

Provision is made for an observer comprising a sensor model of the lambda probe, said model being arranged in a feedback branch of the observer. The observer is so designed that the cylinder-specific lambda deviation signals are supplied to its input side. Consequently, the cylinder-specific lambda deviation signals are coupled into a forward branch of the observer, particularly in conjunction with the output signal of the sensor model, e.g. by forming a difference.

The observer is additionally designed such that its observer output variables relating to the respective cylinder are representative of deviations of the injection characteristics of the injection valve of the respective cylinder from predefined injection characteristics.

Provision is made for a parameter detection unit, which is designed to impose a predefined disturbance pattern from cylinder-specific mixture deviations. It is also designed to modify at least one parameter of the sensor model as a detection parameter, in response to the respectively predefined disturbance pattern, until at least one of the observer output variables represents (in a predefined manner) that portion of the disturbance pattern which is assigned to its cylinder. When this is the case, the at least one detection parameter is output.

The at least one parameter of the sensor model can be an amplification factor or build-up time, for example. The sensor model can be PT1-based, for example, and the at least one detection parameter can therefore be one or more of the parameters of a PT1 element, for example.

The observer can be used very effectively to determine the actual value of the detection parameter or detection parameters. For example, a change in the dynamic response of the lambda probe due to e.g. aging effects can be reliably identified thus.

While determining the at least one detection parameter, a cylinder-specific lambda control that may be present is preferably deactivated, meaning that it is not actively supplied with any current values for the respective observer output variables, i.e. open loop operation applies with regard to the cylinder-specific lambda control. In this way, it is possible to determine a current dynamic response of the lambda probe with particular accuracy. When not determining the at least one detection parameter, the cylinder-specific lambda control that may be present is preferably activated at least occasionally.

According to an embodiment, the device comprises a diagnostic unit which is designed to determine, as a function of the at least one detection parameter, whether the lambda probe is operating correctly or incorrectly. This allows particularly effective diagnosis of the lambda probe without additional hardware expense.

According to a further embodiment, the device for operating the internal combustion engine comprises an adaptation unit which is designed to adapt at least one parameter of the sensor model as a function of the at least one detection parameter, for operation with respective cylinder-specific lambda regulators which are so designed as to be supplied in each case with the respective observer output variable as an input variable that is assigned to the respective cylinder, and the respective regulator actuating signal influences the metered fuel mass in the respective cylinder.

In this way, the sensor model can be adapted particularly effectively to the current dynamic properties of the lambda probe, thereby contributing to a particularly accurate cylinder-specific lambda control.

According to a further embodiment, the parameter detection unit is designed such that the respectively predefined disturbance pattern is emission-neutral. In this way, the precise determination of the at least one detection parameter can take place to a large extent without any negative influence on the harmful emissions of the internal combustion engine.

According to a further embodiment, the lambda probe is designed as a binary lambda probe. Provision is further made for a binary lambda regulator, which is designed such that its control input variable depends on a signal of the binary lambda probe, and such that its regulator actuating signal influences a metered fuel mass. In this case, the assignment unit is preferably designed such that, when the measured signal of the binary lambda probe is outside of a transition phase between a lean phase and a rich phase, the cylinder-specific lambda signals are determined as a function of the measured signals of the binary lambda probe.

In this context, the insight is applied that although a relatively large measured-signal change occurs in the transition phase between the lean phase and the rich phase, the lambda-signal change to be assigned is relatively small. In this context, the lambda signal is understood to be in particular a signal which has been normalized in respect of the so-called air ratio, and whose value assumes the value 1 in the case of a stoichiometric air/fuel ratio.

Also applied is the insight that precisely in the rich phase and also in the lean phase, and in fact due to the cylinder-specific different actual air/fuel ratios, an oscillation that is modulated to the measured signal of the binary lambda probe has a smaller amplitude than in the transition phase, yet the respective differences in the assigned lambda signal appear more characteristic. It is thus evident that, using such a signal analysis, the respective cylinder-specific lambda signals can also be determined very precisely by means of a binary lambda probe and therefore, using the respective cylinder-specific lambda regulator, it is possible to compensate very precisely for tolerances or deviations of the injection characteristics of the injection valve of the respective cylinder from predefined injection characteristics. The predefined injection characteristics can relate e.g. to a predefined reference injection valve, which was measured e.g. at an engine test stand. Furthermore, the predefined injection characteristics can also be e.g. average injection characteristics of all injection valves of the respective cylinders. The device also makes it possible advantageously to compensate for further deviations from predefined reference characteristics, relating to e.g. components of the intake train. Also applied in this context is the insight that the corresponding deviations, e.g. in particular of the injection characteristics of the respective injection valve from the predefined injection characteristics, can typically be considerably greater than the fluctuations that are provoked in the context of control using the lambda regulator.

An internal combustion engine (FIG. 1) comprises an intake train 1, an engine block 2, a cylinder head 3 and an exhaust-gas train 4. The intake train 1 preferably comprises a throttle valve 5, a collector 6 and an induction pipe 7, which is routed to a cylinder Z1 via an inlet train into the engine block 2. The engine block 2 additionally comprises a crankshaft 8, which is connected via a connecting rod 10 to the piston 11 of the cylinder Z1.

The cylinder head 3 comprises a valve gear which has a gas-inlet valve 12 and a gas-outlet valve 13.

The cylinder head 3 further comprises an injection valve 18 and a spark plug 19. Alternatively, the injection valve 18 can also be arranged in the induction pipe 7.

Also arranged in the exhaust-gas train 4 is an exhaust-gas catalytic converter 21, which is preferably designed as a three-way catalytic converter and is arranged e.g. very close to the outlet to which the outlet valve 13 is assigned.

A further exhaust-gas catalytic converter, which is designed e.g. as an NOx catalytic converter 23, can also be arranged in the exhaust-gas train 4.

Provision is made for a control device 25 to which are assigned sensors, wherein said sensors capture various measured variables and determine the value of the measured variable in each case. In addition to the measured variables, operating variables also include variables that are derived from these.

Depending on at least one of the operating variables, the control device 25 is designed to determine actuating variables which are then converted into one or more actuating signals for controlling the actuators by means of corresponding servomechanisms. The control device 25 can also be referred to as a device for controlling the internal combustion engine or as a device for operating the internal combustion engine.

The sensors comprise a pedal position sensor 26, which captures an accelerator pedal position of an accelerator pedal 27, an air-mass sensor 28, which captures an air-mass flow upstream of the throttle valve 5, a first temperature sensor 32, which captures an intake air temperature, an induction-pipe pressure sensor 34, which captures an induction-pipe pressure in the collector 6, and a crankshaft-angle sensor 36, which detects a crankshaft angle to which a rotational speed N is then assigned.

Provision is further made for a lambda probe 42, which is arranged upstream of the exhaust-gas catalytic converter 21 or in the exhaust-gas catalytic converter 21, and which captures a residual oxygen content of the exhaust gas, and whose measured signal MS1 is characteristic of the air/fuel ratio in the combustion chamber of the cylinder Z1 and upstream of the lambda probe 42 before the oxidation of the fuel, subsequently referred to as the air/fuel ratio in the cylinder Z1. The lambda probe 42 can be arranged in the exhaust-gas catalytic converter, such that part of the volume of the catalytic converter is situated upstream of the lambda probe 42. The lambda probe 42 can be designed as a jump probe, for example, and can therefore also be referred to as a binary lambda probe. The lambda probe can also be designed as a wideband probe, for example, which is also referred to as a linear lambda probe.

In contrast with the wideband probe, the dynamic response of the binary lambda probe is markedly non-linear, particularly during one of the transition phases between a lean phase and rich phase. The analysis of the measured signal in the non-linear range and therefore an analysis of the cylinder-selective lambda deviation is a challenge, because the drop or rise of the measured signal can take place more quickly than the duration of a work cycle in some circumstances, depending on the probe dynamics. Moreover, conversion of the measured signal into a lambda signal is clearly imprecise during the transition phase, since the lambda sensitivity is very limited in this range.

In principle, an exhaust-gas probe can also be arranged downstream of the exhaust-gas catalytic converter 21.

Depending on the embodiment, provision can be made for any subset of the cited sensors, or indeed for additional sensors.

The actuators are e.g. the throttle valve 5, the gas-inlet and gas-outlet valves 12, 13, the injection valve 18 or the spark plug 19.

In addition to the cylinder Z1, provision is additionally made for further cylinders Z2 to Z3, to which corresponding actuators and possibly sensors are then also assigned. The cylinders Z1 to Z3 can therefore be assigned to an exhaust-gas bank, for example, and have a shared lambda probe 42 assigned to them. Moreover, it is naturally possible to provide further cylinders, these being assigned to a second exhaust-gas bank, for example. The internal combustion engine can therefore comprise any number of cylinders.

Figure 2:
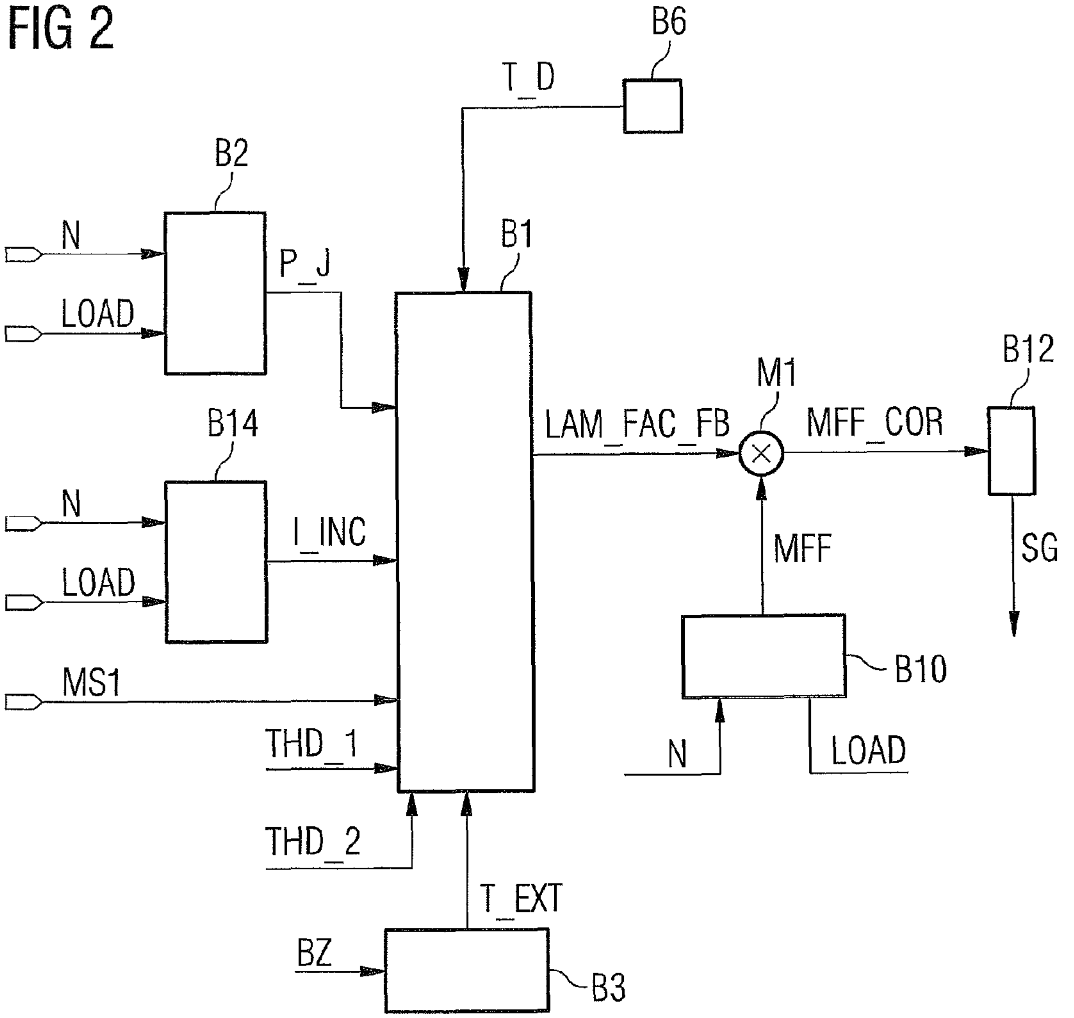
FIG. 2 shows a block diagram of a lambda regulator.

In an exemplary embodiment, the control device 25 comprises a binary lambda control, which is explained in greater detail with reference to FIG. 2 by way of example. A block 1 comprises a binary lambda regulator, which is so designed that the measured signal MS1 of the lambda probe 42, which is designed as a binary lambda probe, is supplied as a control variable, which can also be referred to as a control input variable. Due to the binary nature of the measured signal MS1 of the binary lambda probe, the binary lambda regulator is designed as an on/off regulator. In this case, the binary lambda regulator is designed to identify a lean phase LEAN on the basis of the measured signal MS1 being smaller than a predefined rich-lean threshold value THD_1, which can have a value of approximately 0.2 V, for example. Furthermore, the binary lambda regulator is designed to identify a rich phase RICH on the basis of the measured signal MS1 of the lambda probe 42 (which is designed as a binary lambda probe) having a value that is greater than a predefined lean-rich threshold value THD_2. The predefined lean-rich threshold value THD_2 can have a value of approximately 0.6 V, for example. Furthermore, the binary lambda regulator is preferably designed such that a predefined off-time must elapse after identifying a lean or rich phase LEAN, RICH before a transition operation TRANS is identified again. In this way, any instability of the lambda regulator can be very effectively prevented, even in the event of superimposed oscillations of the measured signal MS1.

The binary lambda regulator is preferably designed as a PI regulator. A P-portion is preferably supplied to the block B1 as proportional jump P_J. Provision is made for a block B2, in which the proportional jump P_J is determined as a function of the rotational speed N and a load LOAD. A characteristic map, which can be permanently stored, is preferably provided for this purpose.

An I-portion of the binary lambda regulator is preferably determined as a function of an integral increment I_INC. The integral increment I_INC is preferably determined in a block B14, and is also dependent on the rotational speed N and the load LOAD. A characteristic map, for example, can likewise be provided for this purpose. The load LOAD can be e.g. the air-mass flow or also e.g. the induction-pipe pressure.

Also supplied to the block B1 as an input parameter is a time delay T_D, which is determined in a block B6 and preferably as a function of a trim regulator interaction. A measured signal of the further exhaust-gas probe is used here in the context of trim control.

Furthermore, a time extension T_EXT can be supplied to the block B1. The time extension T_EXT is determined in a block B3, e.g. as a function of the current operating state BZ of the internal combustion engine at the time. In this regard, provision is preferably made for the value of the time extension in a first operating state BZ1 to be clearly greater in comparison with a second operating state BZ2. For example, the time extension T_EXT is equal to zero in the second operating state, while being in the order of e.g. one or more work cycles in the first operating state BZ1. The first operating state BZ1 can be assumed depending on a time condition, for example, i.e. within predefined time intervals relative to an engine operation or other reference point, for example, or relative to a predefined performance, for example.

The regulator actuating signal LAM_FAC_FB of the binary lambda regulator is output on its output side and influences a metered fuel mass. The regulator actuating signal LAM_FAC_FB of the binary lambda regulator is supplied to a multiplier unit M1 in which, by means of multiplication with a metered fuel mass MFF, a corrected metered fuel mass MFF_COR is determined.

Provision is made for a block B10 in which the metered fuel mass MFF is determined as a function of the rotational speed N and the load LOAD, for example. For this purpose, provision can be made for e.g. one or more characteristic maps which are determined in advance at an engine test stand, for example.

A block B12 is designed to determine an actuating signal SG, in particular for the injection valve 18, as a function of the corrected metered fuel mass MFF_COR.

The block B1 is designed to determine the regulator actuating variable LAM_FAC_FB of the binary lambda regulator for a plurality of cylinders Z1 to Z3, i.e. in particular those cylinders Z1 to Z3 to which a single binary lambda probe 42 is assigned. This applies correspondingly for the block B10 in particular.

Figure 3:
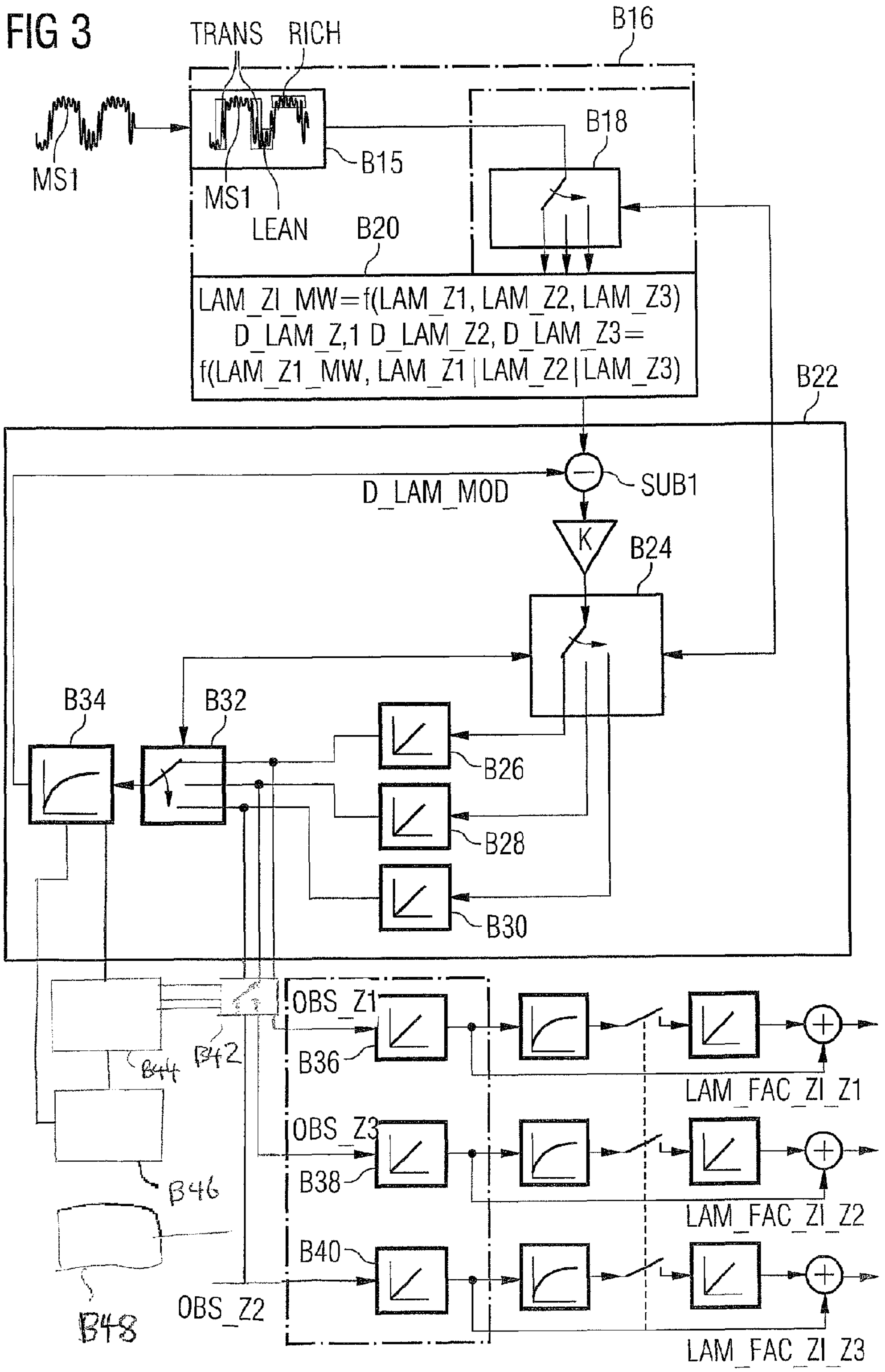
FIG. 3 shows a block diagram in the context of a cylinder-specific lambda control.

A cylinder-specific lambda control is explained in greater detail with reference to FIG. 3. With reference to a typical signal profile of the measured signal MS1, it can be seen that superimposed oscillations are modulated upon the typical rectangular or trapezoid basic form of the measured signal, said oscillations being caused in particular by deviations of the injection characteristics of the respective injection valves 18, of the respective cylinders Z1 to Z3, from predefined injection characteristics. Likewise plotted in a block B15 is the measured signal MS1 of the lambda probe 42, this being designed e.g. as a binary lambda probe, wherein the respective transition phases TRANS, rich phases RICH and lean phases LEAN are illustrated schematically.

A block B16 comprises an assignment unit which is designed such that, when the measured signal MS1 of the lambda probe 42 (designed as a binary lambda probe) is outside of a transition phase TRANS between a lean phase LEAN and a rich phase RICH, cylinder-specific lambda signals LAM_Z1, LAM_Z2, LAM_Z3 are determined as a function of the measured signal MS1 of the lambda probe 42 and, as a function of the cylinder-specific lambda signals LAM_Z1, LAM_Z2, LAM_Z3, cylinder-specific lambda deviation signals D_LAM_Z1, D_LAM_Z2, D_LAM_Z3 for the respective cylinders are determined with reference to a lambda signal LAM_ZI_MW that is averaged over the cylinder-specific lambda signals LAM_Z1, LAM_Z2, LAM_Z3.

Figure 4:
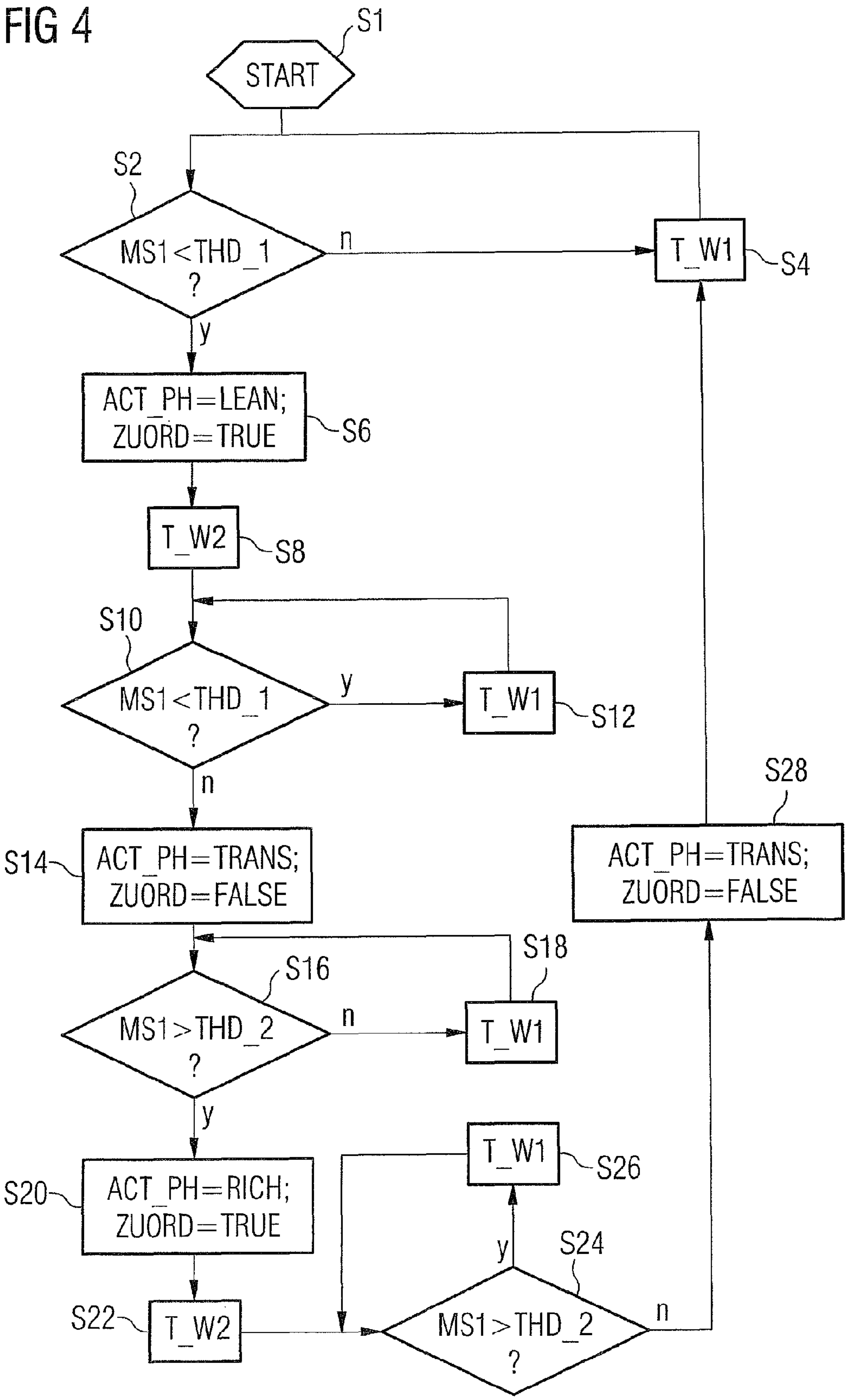
FIG. 4 shows a first flow diagram of a program which is executed in the control device.

For this purpose, provision is preferably made for programs which are executed in the control device during the operation of the internal combustion engine, said programs being explained in greater detail below with reference to the FIGS. 4 and 5. The program according to FIG. 4 is started in a step S1, in which variables can be initialized if applicable.

In a step S2, a check establishes whether the measured signal MS1 of the binary lambda probe is smaller than the rich-lean threshold value THD_1. If this is not the case, the processing continues in a step S4, in which the program pauses for a predefined first wait time T_W1 or is even interrupted, wherein the first wait time T_W1 is so predefined as to be suitably short for the conditions of the step S2 to be checked suitably often. Furthermore, the predefined wait time T_W1 in the step S4 can also be predefined as a function of the current rotational speed at the time and therefore relative to a crankshaft angle.

If the condition of the step S2 is not satisfied, it is preferably possible, in particular directly after the step S2 is first processed following the start of the program in the step S1, also to continue the processing in a step S16, which is explained in greater detail below, and if the condition of the step S16 is not satisfied in this case, the processing is then continued in the step S4, wherein this modified execution is then performed until either the condition of the step S2 or that of the step S16 is satisfied for the first time.

If the condition of the step S2 is satisfied, however, the lean phase LEAN is assigned a current phase ACT_PH and an assignment flag ZUORD is additionally set to a true value TRUE in a step S6. The program then pauses in a step S8 for a predefined second wait time T_W2, or is interrupted for this time, wherein the second wait time T_W2 is so predefined as to be correlated to the duration of the off-time in particular.

In a step S10, a check then establishes whether the measured signal MS1 of the binary lambda probe is smaller than the rich-lean threshold value THD_1. If this is the case, the lean phase LEAN remains valid as the current phase ACT_PH and the program pauses in a step S12 or is interrupted during this step, as per the step S4 for the predefined first wait time T_W1, before the step S10 is executed again.

If the condition of the step S10 is not satisfied, however, the current phase ACT_PH is assigned the transition phase TRANS and the assignment flag ZUORD is set to a false value FALSE in a step S14.

In a step S16, a check then establishes whether the measured signal MS1 of the binary lambda probe 42 is greater than the lean-rich threshold value THD_2. If the condition of the step S16 is not satisfied, the program pauses in a step S18, as per the procedure in step S4 for the predefined first wait time, T_W1 before the step S16 is executed again.

If the condition of the step S16 is satisfied, however, the current phase ACT_PH is assigned the rich phase RICH and the assignment flag ZUORD is assigned the true value TRUE in a step 16.

The program then pauses in a step S22, and specifically for the predefined second wait time T_W2 as per the step S8, and it can therefore also be interrupted during the step S22.

In a step S24, a check then establishes whether the measured signal MS1 of the lambda probe 42 continues to be greater than the lean-rich threshold value THD_2. If this is the case, the processing continues in a step S26 as per the step S4. Following the step S26, the processing continues again in the step S24.

If the condition of the step S24 is not satisfied, however, the current phase ACT_PH is assigned the transition phase TRANS and the assignment flag ZUORD is assigned the false value FALSE in a step S28, before the processing continues in the step S4.

A further program is executed in quasi-parallel with the program according to FIG. 4, and is explained in greater detail with reference to FIG. 5. The program is started in a step S30, in which variables can be initialized if applicable. In a step S32, a check establishes whether the assignment flag ZUORD is set to its true value TRUE. If this is not the case, the processing continues in a step S34, in which the program is paused for the predefined first wait time T_W1 or is even interrupted as per the procedure in the step S4, before the processing continues again in the step S32.

If the condition of the step S32 is satisfied, however, the cylinder-specific lambda signals LAM_Z1, LAM_Z2 and LAM_Z3 relating to the cylinders Z1, Z2, Z3 are determined in a step S36 as a function of the measured signal MS1 of the lambda probe 42. In this context, a correspondingly segment-synchronous sampling takes place, specifically such that the respective exhaust-gas packets are then representative of the respective cylinders Z1 to Z3 in each case. Furthermore, the cylinder-specific lambda signals LAM_Z1, LAM_Z2, LAM_Z3 are determined as a function of the measured signal MS1 of the binary lambda probe 42, preferably as a function of a characteristic curve, and also preferably in each case as a function of a separately predefined characteristic curve for the rich phase RICH, specifically a lambda-rich characteristic curve KL_R, and a lambda-lean characteristic curve KL_L which is predefined for the lean phase LEAN. These characteristic curves are preferred in this case. Following the step S36, the processing continues in the step S34.

The assignment unit in the block B16 (FIG. 3) also features a block B18 comprising a changeover switch. The changeover switch is designed to perform a changeover that correlates in each case to the respective time points at which the respective exhaust-gas packet is representative for the respective cylinder Z1 to Z3. A changeover therefore takes place when the measured signal MS1 of the lambda probe changes in respect of its characteristics for the respective cylinder, i.e. from the cylinder Z1 to the cylinder Z2 or cylinder Z3, for example.

A block B20 is designed to determine an average lambda signal LAM_ZI_MW as a function of the cylinder-specific lambda signals LAM_Z1, LAM_Z2, LAM_Z3. The block B20 is further designed to determine respective cylinder-specific lambda deviation signals D_LAM_Z1, D_LAM_Z2, D_LAM_Z3, specifically as a function of a difference between the respective cylinder-specific lambda signal LAM_Z1, LAM_Z2, LAM_Z3 and the average lambda signal LAM_ZI_MW on the other side. Depending on the current position of the changeover switch in the block B18, the respective cylinder-specific lambda deviation signal D_LAM_Z1, D_LAM_Z2, D_LAM_Z3 is determined for the cylinder Z1 to Z3 which is relevant at the time.

Alternatively, the assignment unit can also be designed to determine the cylinder-specific lambda deviation signals D_LAM_Z1, D_LAM_Z2, D_LAM_Z3 as a function of the measured signal of a lambda probe that is designed as a wideband probe.

In this case, only correspondingly synchronized sampling of the measured signal MS1 of the lambda probe 42 is required for the purpose of determining the cylinder-specific lambda signals LAM_Z1, LAM_Z2, LAM_Z3.

The currently determined cylinder-specific lambda deviation signal D_LAM_Z1, D_LAM_Z2, D_LAM_Z3 in each case is supplied to a block B22 which comprises an observer, specifically to a subtractor unit SUB1, where the difference relative to a model lambda deviation signal D_LAM_MOD is determined, wherein the model lambda deviation signal D_LAM_MOD is the output signal of a sensor model. This difference is then amplified in an amplifier K and subsequently supplied to a block B24, which likewise features a changeover switch that is switched synchronously with that of the block B18.

On its output side, the block B24 is coupled depending on its switch position to a block B26, a block B28 or a block B30. The blocks B26, B28 and B30 comprise in each case an I-element, i.e. an integrating element which integrates the signal that is present at its input. The output variable of the block B26 is representative of a deviation of the injection characteristics of the injection valve 18 of the cylinder Z1 from predefined injection characteristics and provides the observer output variable OBS_Z1, which is representative of the deviation of the injection characteristics of the injection valve of the cylinder Z1 from predetermined injection characteristics. For example, the predefined injection characteristics can be average injection characteristics of all injection valves 18 of the respective cylinders Z1, Z2, Z3. The same applies correspondingly to the observer output variables OBS_Z2, OBS_Z3, which are the output variables of the blocks B28 and B30 respectively, relating to the cylinders Z2 and Z3 respectively.

Moreover, provision is made for a further changeover switch in a block B32, at whose input side are supplied the observer output variables OBS_Z1, OBS_Z2 and OBS_Z3, and whose changeover switch is switched synchronously with those of the blocks B18 and B24, and whose output signal forms an input variable of a block B34.

The block B34 comprises a sensor model of the lambda probe 42. This sensor model is realized e.g. in the form of a PT1 element, but can also comprise other elements. As parameters, it comprises e.g. an amplification factor and a build-up time parameter. At the output side of the block B34, the model lambda deviation signal D_LAM_MOD is then generated as an output of the sensor model.

The respective observer output variables OBS_Z1, OBS_Z2 and OBS_Z3 are supplied to cylinder-specific lambda regulators, which take the form of a block B36, B38 and B40 in each case. The cylinder-specific lambda regulators can feature an integral portion, for example. The respective regulator actuating signal LAM_FAC_ZI_Z1, LAM_FAC_ZI_Z2, LAM_FAC_ZI_Z3 influences the fuel mass MFF that is to be metered into the respective cylinders Z1, Z2, Z3, and in this respect an individual correction can be effected in the multiplier unit M1, for example, with reference to the respective cylinders Z1 to Z3. Furthermore, corresponding adaptation values can also be determined, also as a function of the respective cylinder-specific regulator actuating signals LAM_FAC_ZI_Z1, LAM_FAC_ZI_Z2, LAM_FAC_ZI_Z3, as illustrated by the schematically indicated further blocks following the blocks B36 to B40.

Figure 6:
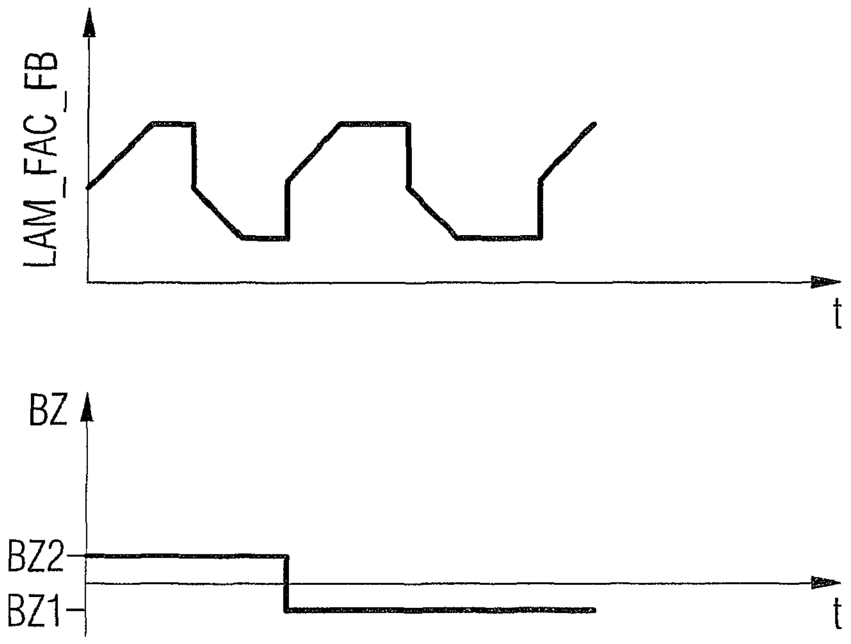
FIG. 6 shows signal profiles plotted over time.

FIG. 6 illustrates a further exemplary profile of the regulator-actuating signal LAM_FAC_FB of the lambda regulator, for both the first operating state BZ1 and the second operating state BZ2.

Provision is made for a block B42 (FIG. 3) which is designed to switch the observer output variables OBS_Z1, OBS_Z2, OBS_Z3 (relating to the respective cylinders Z1 to Z3) either to the blocks B36 to B40 or to a block B44, which comprises a parameter detection unit. The parameter detection unit is designed in such a way that, when it is subjected to the observer output variables OBS_Z1, OBS_Z2, OBS_Z3, it imposes a predefined disturbance pattern from cylinder-specific mixture deviations and, in response to the respectively predefined disturbance pattern, changes at least one parameter of the sensor model as detection parameter PARAM_DET until at least one of the observer output variables represents (in a predefined manner) that part of the disturbance pattern PAT which is assigned to its respective cylinder Z1 to Z3, and then outputs the at least one detection parameter PARAM_DET.

The output can take place at a block B46, for example, which comprises an adaptation unit. Alternatively or additionally, the output can also take place at a block B48, which comprises a diagnostic unit.

The detection parameter or detection parameters PARAM_DET are imposed on at least the sensor model of the block B34, if the parameter detection unit is active and imposes the predefined disturbance pattern. Consequently, in the sensor model, the parameter PARAM which is assigned to the respective detection parameter PARAM_DET is then at least temporarily adapted in a corresponding manner.

A program which is functionally executed in the parameter detection unit is described in greater detail below with reference to the flow diagram in FIG. 7.

The program is started in a step P1, which can be close in time to a start of the internal combustion engine.

In a step P2, a check establishes whether a time counter T_CTR is greater than a predefined time threshold T_THD. The time threshold T_THD is suitably predefined such that an imposition of the interference pattern PAT is performed at approximately suitable intervals. Alternatively, the step P2 can also provide for checking whether a predefined kilometer throughput has occurred since the last time the condition of the step P2 was satisfied.

If the condition of the step P2 is not satisfied, the processing continues in a step P4, in which the program pauses for a predefined wait time T_W3, before the program continues again in the step P2.

If the condition of the step P2 is satisfied, however, a check in step P6 establishes whether the internal combustion engine is in a stationary running mode. This is preferably done by means of analyzing the rotational speed N and/or the load variable LOAD. If the condition of the step P6 is not satisfied, the processing continues in a step P8, in which the program pauses for a predefined wait time T_W4, before the processing continues again in the step P6.

If the condition of the step P6 is satisfied, however, the processing continues in a step P9. In the step P9, a predefined disturbance pattern PAT from cylinder-specific mixture deviations is imposed. In the case of three cylinders Z1, Z2, Z3 per exhaust-gas bank, for example, the following alternative disturbance patterns can be predefined, wherein the percentage numbers in each case represent deviations from an air/fuel ratio in the respective cylinder Z1 to Z3, said air/fuel ratio being predefined without the disturbance pattern in each case, and the respective sequences relate to the cylinders Z1, Z2 and Z3. The disturbance patterns can be predefined e.g. as [+10%, 0%, 0%], [+10%, −5%, −5%], [−10%, +5%, +5%] or also other combinations.

The respective disturbance pattern PAT is preferably predefined so as to be emission-neutral. This can be achieved particularly easily by means of the aggregated deviations across the cylinders adding up to zero.

The imposition of the respective interference pattern PAT preferably takes place such that this is taken into consideration when determining the corrected metered fuel mass MFF_COR.

In a step P10, at least one interference value AMP_MOD_MES relating to a respective cylinder Z1 to Z3 is determined, specifically by analyzing the respectively assigned observer output variable OBS_Z1 to OBS_Z3.

This can be done e.g. by checking when the respective observer output variable OBS_Z1 to OBS_Z3, following the imposition of the interference pattern PAT, enters a plateau phase and hence returns to a quasi-steady state. E.g. an air-mass flow integral can also be formed for the purpose of facilitating this.

In this context, provision is preferably made for analyzing in each case those observer output variable OBS_Z1, OBS_Z2, OBS_Z3 in respect of which, for their assigned cylinder Z1-Z3, a correspondingly deviating mixture was imposed by the disturbance pattern PAT.

The interference value AMP_MOD_MES can be representative of e.g. a deviation of the mixture, provoked by the disturbance pattern PAT, from the value of the respective observer output variable OBS_Z1, OBS_Z2, OBS_Z3 without the imposition of the interference pattern, said value being in particular stationary in each case. However, it can also be representative of e.g. a reconstruction duration, which correlates to the duration from the imposition of the interference pattern until the plateau phase is reached.

In a step P12, a check then establishes whether the determined interference value AMP_MOD_MES corresponds approximately to an expected interference value AMP_MOD_NOM. The expected interference value AMP_MOD_NOM is preferably predefined as a function of at least one operating variable of the internal combustion engine, and in particular relative to specific load points and rotational-speed points. In this context, it can be taken into consideration that, for example, 100% detection of the respective interference pattern is not expected at specific operating points, in particular due to corresponding parameterization of the sensor model.

If the condition of the step P12 is not satisfied, the processing continues in a step P14. In the step P14, at least one detection parameter PARAM_DET is adapted, in the sense of a reduction in the deviation between the determined interference value and the expected interference value AMP_MOD_MES, AMP_MOD_NOM.

The detection parameter PARAM_DET is one or more of the parameters PARAM of the sensor model and can therefore be an amplification factor, for example. However, it can also be a build-up time parameter, for example. In this context, e.g. in the case of a PT1 element, the transfer function of the sensor model can be KM/(1+TA·s), where KM then represents the amplification factor and TA represents the build-up time parameter.

Following the processing of the step P14, the processing continues again in the step P10.

If the condition of the step P12 is satisfied, however, this being the case if e.g. the determined interference value AMP_MOD_MES deviates maximally from the expected interference value AMP_MOD_NOM by only a predefined small degree, then the detection parameter (or detection parameters) PARAM_DET is output in a step P16. This can take place at the adaptation unit or also at the diagnostic unit, for example.

Following the processing of the step P16, the processing continues again in the step P4.

The time counter T_CTR is cyclically incremented by means of a preferably predefined time counter element, and is reset again when the condition of the step P2 is satisfied.

Figure 8:
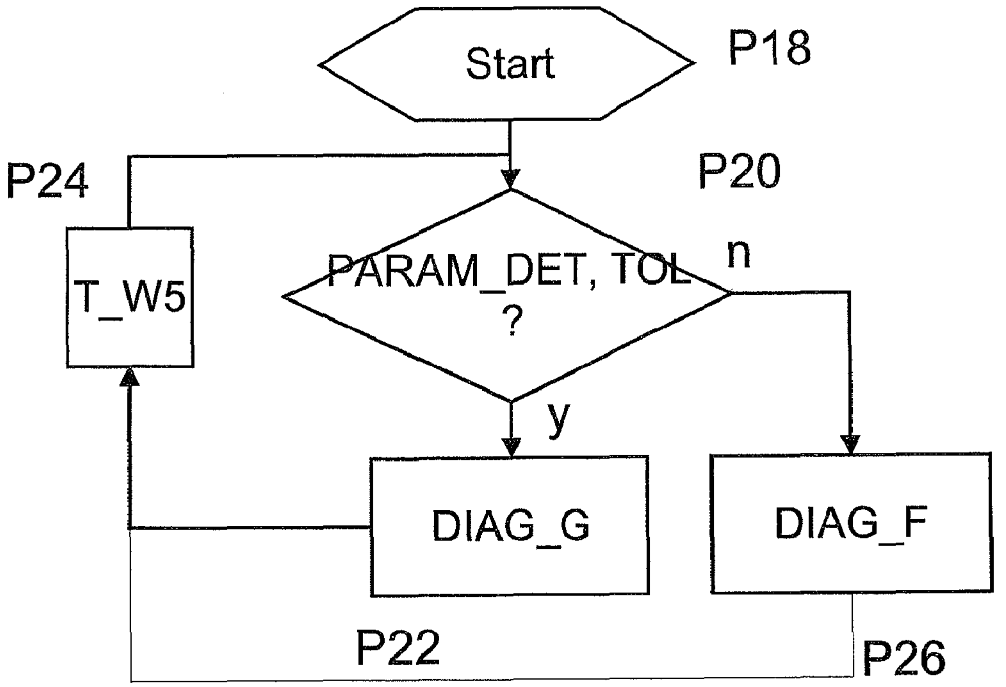
FIG. 8 shows a flow diagram of a program for performing a diagnosis.

A program which is illustrated by means of the flow diagram in FIG. 8 is functionally executed in the diagnostic unit. The program is started in a step P18, in which program parameters can be initialized if appropriate.

In a step P20, a check establishes whether one or more new detection parameters PARAM_DET have been output by the parameter detection unit, and whether these lie within a predefined tolerance range, the relevant tolerance range TOL being so predefined that without-error functioning of the lambda probe 42 can be assumed if the respective detection parameter PARAM_DET lies within the tolerance range TOL, and that with-error functioning of the lambda probe 42 must be assumed otherwise.

If the condition of the step P20 is satisfied, a without-error diagnostic value DIAL_G is set in a step P22 and the processing continues in a step P24, in which the program pauses for a predefined wait time TW5, before the processing continues again in the step P20.

If the condition of the step P20 is not satisfied, however, a with-error diagnostic value DIAL_F is set in a step P26 and an error can be output as a function of this, e.g. to a driver of the vehicle or to a spring memory.

Following the processing of the step P26, the processing likewise continues in the step P24.

Figure 9:
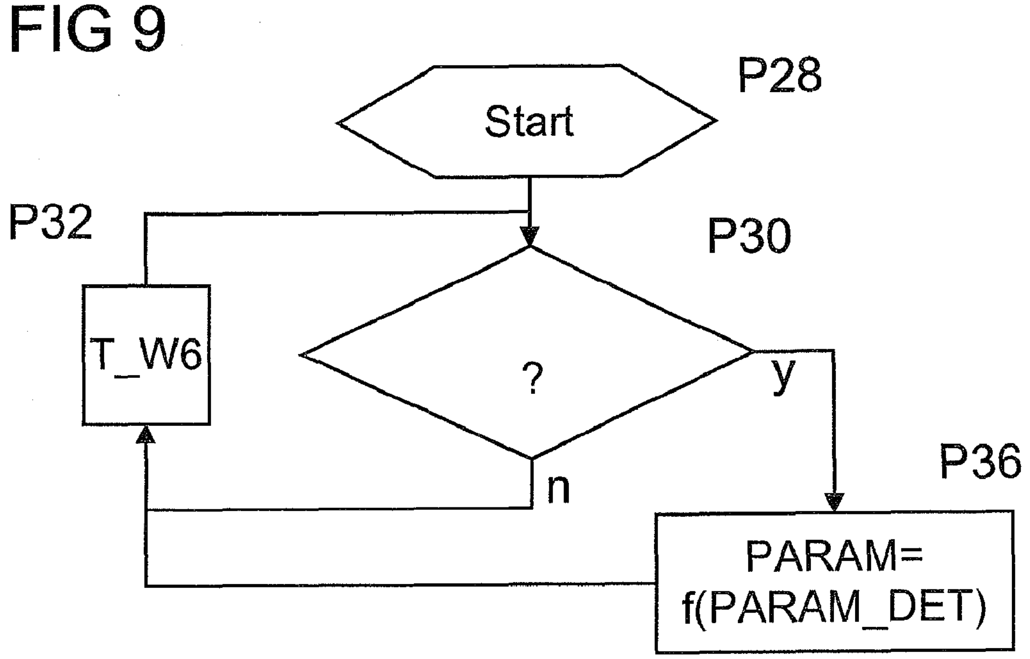
FIG. 9 shows a flow diagram of a program for performing an adaptation.

A program that is explained in greater detail with reference to the flow diagram in FIG. 9 is functionally executed in the adaptation unit.

The program is started in a step P28, in which program parameters can be initialized if appropriate.

In a step P30, a check establishes whether at least one detection parameter PARAM_DET has been output from the parameter detection unit and optionally whether further requirements have been satisfied. The further requirements can consist in, for example, the presence of predefined operating conditions which suitably allow an adaptation of at least one parameter PARAM of the sensor model, such that the resulting adapted observer output variables OBS_Z1 to OBS_Z3 can be taken in into consideration as part of the cylinder-specific lambda control.

If the condition of the step P30 is not satisfied, the processing continues in a step P32, in which the program pauses for a further wait time T_W6, before the processing continues again in the step P30.

If the condition of the step P30 is satisfied, however, the processing continues in a step P36.

In the step P36, at least one parameter PARAM of the sensor model is adapted and, specifically as a function of the detection parameter or detection parameters PARAM_DET in this context, the corresponding detection parameter PARAM_DET can be directly assigned to the respective parameter PARAM in terms of value, for example. An alternative value can also be assigned however, allowing for the required properties of the sensor model. For example, when making a change to the amplification factor in the context of a PT1 model in particular, it must be taken into consideration that this also affects the dynamics of the sensor model and therefore certain limits apply here, in the sense that a necessary stability margin of the cylinder-specific lambda control must be respected.

If applicable, a phase adaptation can also be effected for the purpose of assisting the stability of the cylinder-specific lambda control, i.e. in particular changing the respective sampling time point of the measured signal MS1 for determining the respective cylinder-specific lambda signals LAM_Z1, LAM_Z2, LAM_Z3.

Figure 5:
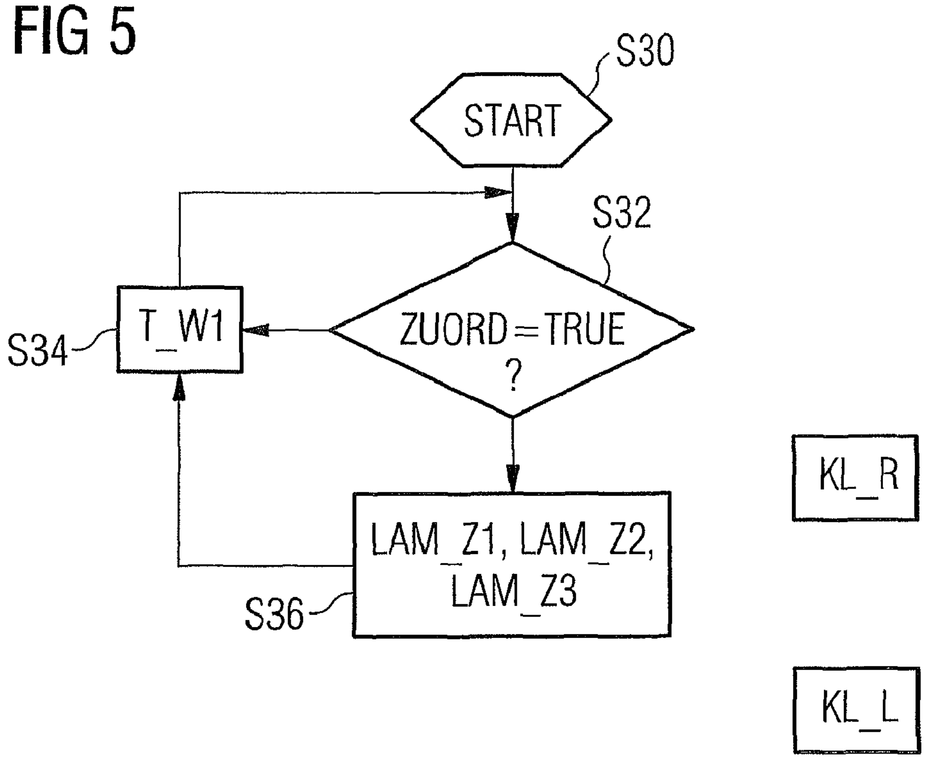
FIG. 5 shows a second flow diagram which is executed in the control device.
Figure 7:
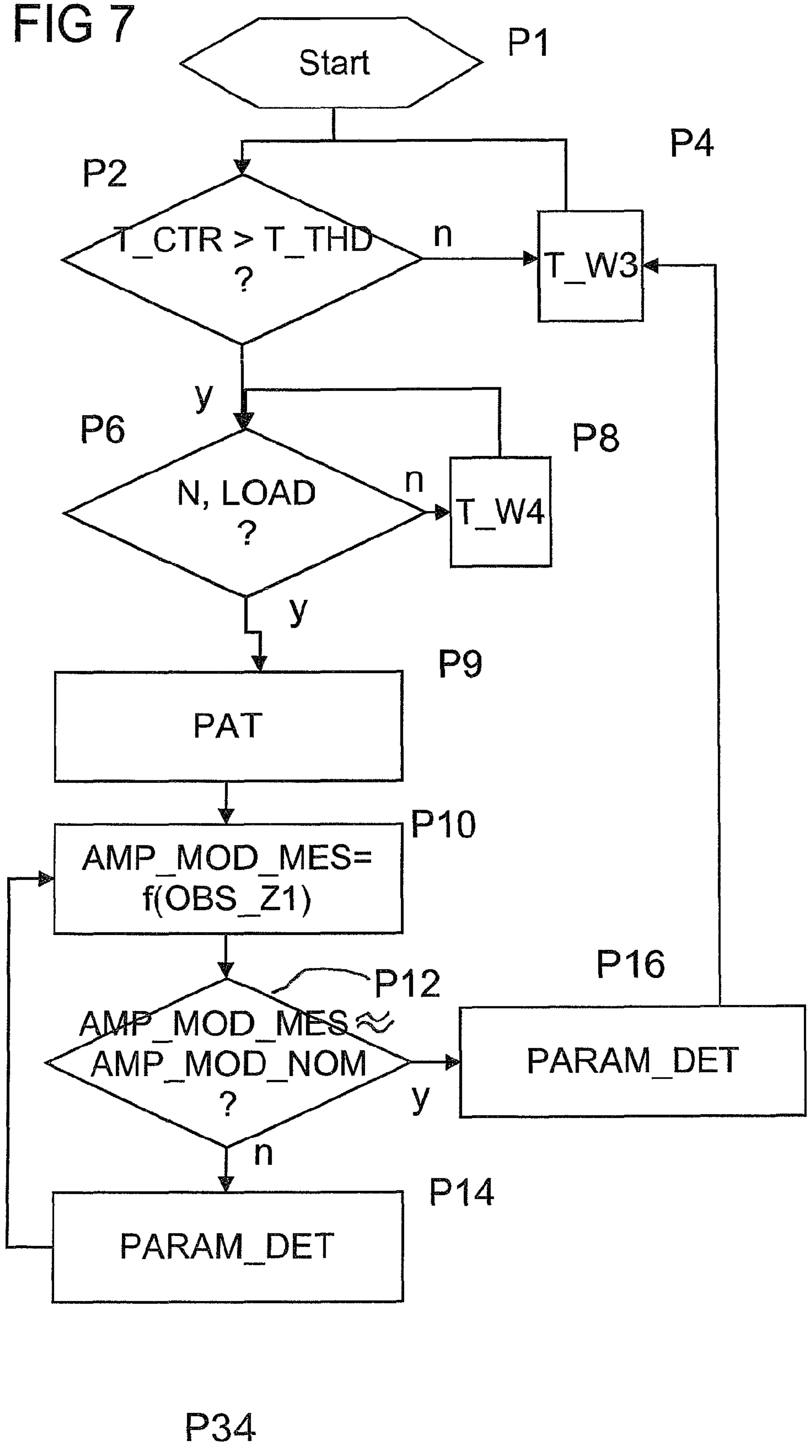
FIG. 7 shows a flow diagram of a program for determining at least one detection parameter.

The programs according to the flow diagrams in FIGS. 7 to 9 and also in FIG. 5 can generally be executed in different computing units or in a shared computing unit, and can likewise be stored in a shared data or program memory or in separate memories.

A forward branch of the block B22 comprises in particular the subtractor unit SUB1 and the blocks B24 to B30.

A linear lambda regulator can naturally be provided instead of the binary lambda regulator in the context of a linear lambda control, particularly if the lambda probe 42 is designed as a wideband probe.

What is claimed is:

1. A device for operating an internal combustion engine which has a plurality of cylinders, each of these being assigned an injection valve, and an exhaust-gas train comprising an exhaust-gas catalytic converter and a lambda probe that is arranged in the exhaust-gas catalytic converter or upstream thereof, comprising:

an assignment unit which is configured to determine cylinder-specific lambda signals as a function of the measured signal of the lambda probe and to determine, as a function of the cylinder-specific lambda signals, lambda deviation signals for the respective cylinders relative to a lambda signal that is averaged over the cylinder-specific lambda signals, an observer comprising a sensor model of the lambda probe, said model being arranged in a feedback branch of the observer, wherein the observer is configured such that the cylinder-specific lambda deviation signals are supplied to its input side, and observer output variables relating to the respective cylinder are representative of deviations of the injection characteristics of the injection valve of the respective cylinder from predefined injection characteristics, and a parameter detection unit, which is configured to impose a predefined disturbance pattern (PAT) from cylinder-specific mixture deviations, modify at least one parameter of the sensor model as a detection parameter, in response to the respectively predefined disturbance pattern, until at least one of the observer output variables represents that portion of the disturbance pattern which is assigned to its cylinder, and output the at least one detection parameter.

2. The device according to claim 1, comprising a diagnostic unit which is designed to determine, as a function of the at least one detection parameter, whether the lambda probe is operating correctly or incorrectly.

3. The device according to claim 1, comprising an adaptation unit which is designed to adapt at least one parameter of the sensor model as a function of the at least one detection parameter, for operation with respective cylinder-specific lambda regulators which are so designed as to be supplied in each case with the respective observer out-put variable as an input variable that is assigned to the respective cylinder, and the respective regulator actuating signal influences the metered fuel mass in the respective cylinder.

4. The device according to claim 1, wherein the parameter detection unit is configured such that the respectively predefined disturbance pattern is emission-neutral.

5. The device according to claim 1, wherein the lambda probe is configured as a binary lambda probe, a binary lambda regulator is provided, which is configured such that a control input variable depends on the signal of the binary lambda probe, and such that its regulator actuating signal influences a metered fuel mass, the assignment unit is configured such that, when the measured signal of the binary lambda probe is outside of a transition phase between a lean phase and a rich phase, the cylinder-specific lambda signals are determined as a function of the measured signal of the binary lambda probe.

6. A method for operating an internal combustion engine which has a plurality of cylinders, each of these being assigned an injection valve, and an exhaust-gas train comprising an exhaust-gas catalytic, converter and a lambda probe that is arranged in the exhaust-gas catalytic converter or upstream thereof, the method comprising:

determining by an assignment unit cylinder-specific lambda signals as a function of the measured signal of the lambda probe and determining by the assignment unit, as a function of the cylinder-specific lambda signals, lambda deviation signals for the respective cylinders, relative to a lambda signal that is averaged over the cylinder-specific lambda signals, supplying the cylinder-specific lambda deviation signals to an input side of an observer comprising a sensor model of the lambda probe, said model being arranged in a feedback branch of the observer, wherein observer output variables relating to the respective cylinder are representative of deviations of the injection characteristics of the injection valve of the respective cylinder from predefined injection characteristics, imposing a predefined disturbance pattern from cylinder-specific mixture deviations by a parameter detection unit, modifying at least one parameter of the sensor model as a detection parameter, in response to the respectively predefined disturbance pattern, until at least one of the observer output variables represents that portion of the disturbance pattern which is assigned to its cylinder, and outputting the at least one detection parameter.

7. The method according to claim 6, further comprising determining by a diagnostic unit, as a function of the at least one detection parameter, whether the lambda probe is operating correctly or incorrectly.

8. The method according to claim 6, further comprising adapting at least one parameter of the sensor model as a function of the at least one detection parameter, for operation with respective cylinder-specific lambda regulators which are so designed as to be supplied in each case with the respective observer output variable as an input variable that is assigned to the respective cylinder, wherein the respective regulator actuating signal influences the metered fuel mass in the respective cylinder.

9. The method according to claim 6, wherein the parameter detection unit is configured such that the respectively predefined disturbance pattern is emission-neutral.

10. The method according to claim 6, wherein the lambda probe is configured as a binary lambda probe, a binary lambda regulator is provided, which is configured such that a control input variable depends on the signal of the binary lambda probe, and such that its regulator actuating signal influences a metered fuel mass, when the measured signal of the binary lambda probe is outside of a transition phase between a lean phase and a rich phase, the cylinder-specific lambda signals are determined by the assignment unit as a function of the measured signal of the binary lambda probe.

* * * * *